United States Patent
Dovzhenko et al.

(10) Patent No.: US 11,875,054 B2
(45) Date of Patent: Jan. 16, 2024

(54) ASYMMETRIC CONFIGURATION ON MULTI-CONTROLLER SYSTEM WITH SHARED BACKEND

(71) Applicant: EMC IP Holding Company LLC, Hopkinton, MA (US)

(72) Inventors: Denis Dovzhenko, Saint Petersburg (RU); Artem Zarafyants, Saint Petersburg (RU); Oleg Soldatenko, Saint Petersburg (RU); Svetlana Kalugina, Moscow (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 17/515,640

(22) Filed: Nov. 1, 2021

(65) Prior Publication Data

US 2022/0342589 A1 Oct. 27, 2022

(30) Foreign Application Priority Data

Apr. 21, 2021 (RU) ............................ RU2021111252

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 10,416,901 B1* | 9/2019 | Wils ...................... | G06F 3/0613 |
| 2017/0364262 A1* | 12/2017 | Roberts ................... | G06F 3/061 |
| 2020/0134100 A1* | 4/2020 | Wils ...................... | G06F 16/9027 |
| 2021/0273807 A1* | 9/2021 | Wertheim ............... | G06F 9/466 |

OTHER PUBLICATIONS

Niv Dayan et al., Chucky: A Succinct Cuckoo Filter for LSM-Tree, Jun. 2021, ACM (Year: 2021).*
Bin Fad el al., Cuckoo Filter: Practically Better Than Bloom, Dec. 2014, ACM (Year: 2014).*

* cited by examiner

*Primary Examiner* — Ryan Bertram
(74) *Attorney, Agent, or Firm* — DALY, CROWLEY MOFFORD & DURKEE, LLP

(57) ABSTRACT

A method comprising: stopping to use one or more first approximate membership filters for servicing of read requests that are incoming to a storage system; increasing a size of a set of first data structures that are available in the storage system, each of the first data structures being used by the storage system for write request amortization; replacing the one or more first approximate membership filters with one or more second approximate membership filters, and building each of the one or more second approximate membership filters by: freezing all non-empty first data structures in the set, and copying respective contents of each of the frozen non-empty first data structures into any of the one or more second approximate membership filters; and starting to use the one or more second approximate membership filters for servicing of read requests that are incoming to the storage system.

20 Claims, 7 Drawing Sheets

ASYMMETRIC CONFIGURATION ON MULTI-CONTROLLER SYSTEM WITH SHARED BACKEND

CROSS REFERENCE TO RELATED APPLICATION

This application claims priority to Russian Patent Application No. 2021111252 filed on Apr. 21, 2021, and entitled "ASYMMETRIC CONFIGURATION ON MULTI-CONTROLLER SYSTEM WITH SHARED BACKEND", which is hereby incorporated herein by reference in its entirety.

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, the method comprising: stopping to use one or more first approximate membership filters for servicing of read requests that are incoming to the storage system; increasing a size of a set of first data structures that are available in the storage system, each of the first data structures being used by the storage system for write request amortization; replacing the one or more first approximate membership filters with one or more second membership filters, and building each of the one or more second approximate membership filters by: freezing all non-empty first data structures in the set, and copying respective contents of each of the frozen non-empty first data structures into any of the one or more second approximate membership filters; and starting to use the one or more second approximate membership filters for servicing of read requests that are incoming to the storage system, wherein the storage system continues to service incoming read requests without using approximate membership filters, after the use of the one or more first approximate filters is stopped, and before the use of the one or more second approximate membership filters has started.

According to aspects of the disclosure, a storage system is provided, comprising: a memory; and at least one processor that is operatively coupled to the memory, the at least one processor being configured to perform the operations of: stopping to use one or more first approximate membership filters for servicing of read requests that are incoming to the storage system; increasing a size of a set of first data structures that are available in the storage system, each of the first data structures being used by the storage system for write request amortization; replacing the one or more first approximate membership filters with one or more second membership filters, and building each of the one or more second approximate membership filters by: freezing all non-empty first data structures in the set, and copying respective contents of each of the frozen non-empty first data structures into any of the one or more second approximate membership filters; and starting to use the one or more second approximate membership filters for servicing of read requests that are incoming to the storage system, wherein the storage system continues to service incoming read requests without using approximate membership filters, after the use of the one or more first approximate filters is stopped, and before the use of the one or more second approximate membership filters has started.

According to aspects of the disclosure, a non-transitory computer-readable medium is provided that stores one or more processor-executable instructions, which, when executed by one or more processors of a storage system, cause the one or more processors to perform the operations of: stopping to use one or more first approximate membership filters for servicing of read requests that are incoming to the storage system; increasing a size of a set of first data structures that are available in the storage system, each of the first data structures being used by the storage system for write request amortization; replacing the one or more first approximate membership filters with one or more second membership filters, and building each of the one or more second approximate membership filters by: freezing all non-empty first data structures in the set, and copying respective contents of each of the frozen non-empty first data structures into any of the one or more second approximate membership filters; and starting to use the one or more second approximate membership filters for servicing of read requests that are incoming to the storage system, wherein the storage system continues to service incoming read requests without using approximate membership filters, after the use of the one or more first approximate filters is stopped, and before the use of the one or more second approximate membership filters has started.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
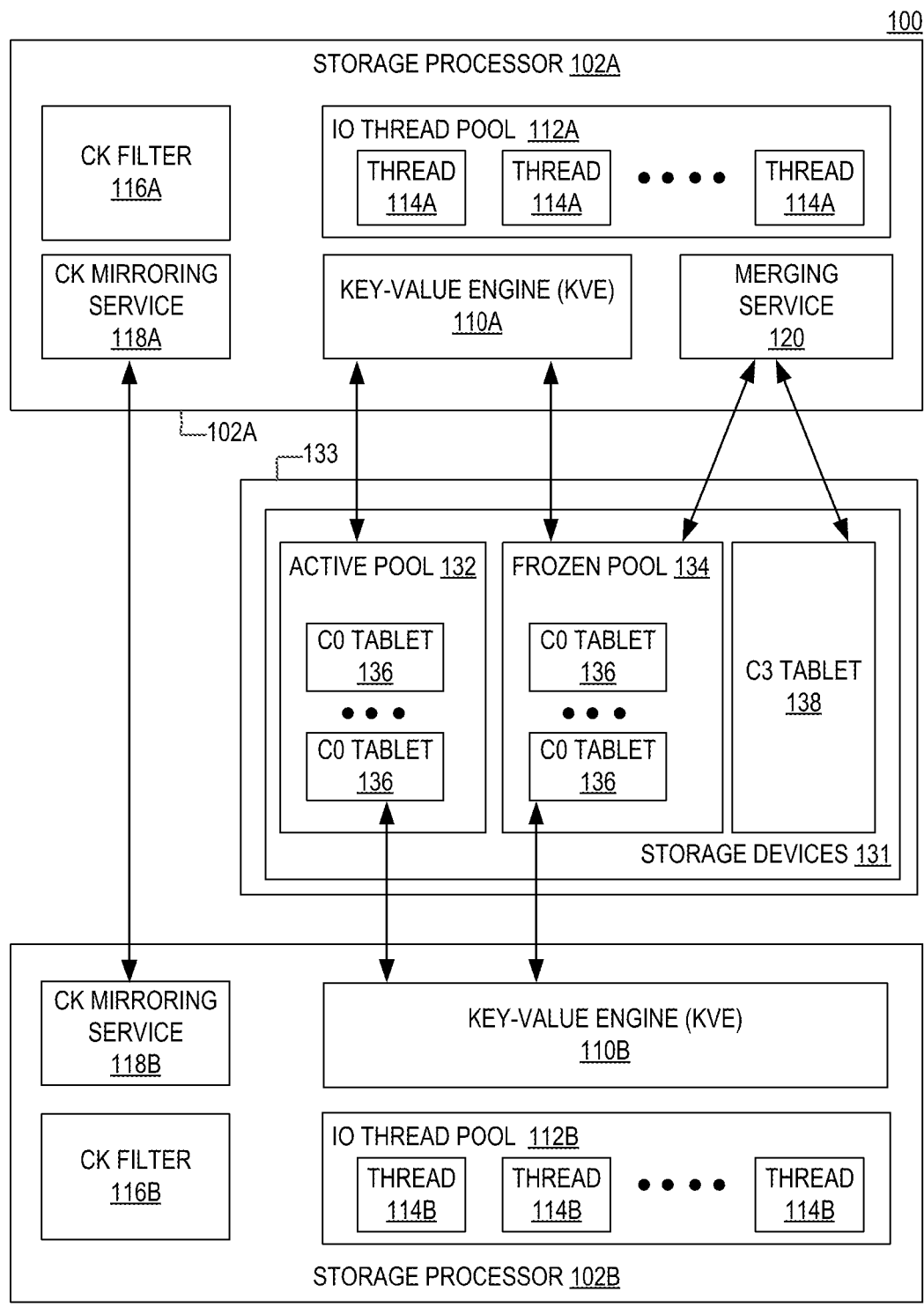
FIG. 1 is a diagram of an example of a storage system, according to aspects of the disclosure.

FIG. 1 is a diagram of an example of a storage system 100, according to aspects of the disclosure. As illustrated, the storage system 100 may include a storage processor 102A, a storage processor 120B, and a backend 133.

The storage processor 102A may include one or more computing devices, such as the computing device 700, which is discussed further below with respect to FIG. 7. The storage processor 102A may be configured to execute a key-value engine (KVE) 110A, an IO thread pool 112A, a Cuckoo filter 116A (hereinafter "Ck filter 116A"), mirroring service 118A, and a merging service 120. KVE 110A may include software that is arranged to store key-value pairs in C0 tablets 136 that are stored on the backend 133. Ck filter 116A includes a probabilistic data structure that is used to test whether a particular key-value pair is currently stored in the C0 tablets 136. Mirroring service 118A may include software that is configured to synchronize the content of Ck filter 116A with the content of Ck filter 116B, so that both Ck filter 116A and Ck filter 116B would store the same information. IO thread pool 112A may include a plurality of IO threads 114A. Each of the IO threads 114A may be configured to service 10 requests that are received at the storage system 100. Merging service 120A may include software that is configured to migrate the contents of frozen C0 tablets 136 into a C3 tablet. In some implementations, the Ck filter 116A may be implemented as a collection of data structure instances (and/or other portions), wherein each data structure instance (or portion) is associated with a different respective C0 tablet 136 (either an active C0 tablet or a frozen C0 table). Each data structure instance (or portion) of the Ck filter 116A may be used to store keys that are stored only in the C0 tablet 136 that is associated with the data structure instance (or portion). In some implementations, the Ck filter 116B may be implemented as a collection of data structure instances (and/or other portions), wherein each data structure instance (or portion) is associated with a different respective C0 tablet 136 (either an active C0 tablet or a frozen C0 tablet). Each data structure instance (or portion) of the Ck filter 116B may be used to store keys that are stored only in the C0 tablet 136 that is associated with the data structure instance (or portion). Although in in the example of FIG. 1, each of the Ck filters 136A-B features a 1-to-1 mapping between C0 tablets and Ck filter portions, it will be understood that the present disclosure is not limited to any specific implementation of the Ck filter 116A and/or the CK filter 116B. As used throughout the disclosure, the phrase "storing a key in a Ck filter" shall refer to either storing the key in the Ck filter as is and/or storing a value that is derived, at least in part, from the key, such as a hash digest of the key.

The storage processor 102B may include one or more computing devices, such as the computing device 700, which is discussed further below with respect to FIG. 7. The storage processor 102B may be configured to execute a key-value engine (KVE) 110B, an IO thread pool 112B, a Cuckoo filter 116B (hereinafter "Ck filter 116B"), mirroring service 118B, and a merging service 120. KVE 110B may include software that is arranged to store key-value pairs in C0 tablets 136 that are stored on the backend 133. Ck filter 116B includes a probabilistic data structure that is used to test whether a particular key-value pair is currently stored in the C0 tablets 136. Mirroring service 118B may include software that is configured to synchronize the content of Ck filter 116B with the content of Ck filter 116A, so that both Ck filter 116A and Ck filter 116B would store the same information. 10 tread pool 112 may include a plurality of IO threads 114B. Each of the IO threads 114B may be configured to service 10 requests that are received at the storage system 100.

The backend 133 may include one or more storage devices 131. Each of the storage devices 131 may include a solid-state drive (SSD), a hard drive, a non-volatile random-access memory (nvRAM) device, and/or any other suitable type of storage device. In some implementations, the backend 133 may store (e.g., in an nvRAM device), an active pool 132, a frozen pool 134, and a C3 tablet 138. The active pool may include one or more active C0 tablets. The frozen pool may include one or more frozen C0 tablets. An active tablet C0 tablet may include a C0 tablet that is placed in the active pool 132 and available for assignment to any of the IO threads 114A and 114B. A frozen C0 tablet may include a C0 tablet that is placed in the frozen pool 134, and is waiting to be merged into the C3 tablet 138. Frozen C0 tablets are write-protected and they are not assigned to IO threads 114A and 114B, before they are moved into the active pool 132.

In some implementations, any of the C0 tablets 136 may include a data structure that is used for write amortization. The term "write amortization" as used herein refers to the practice of accumulating key value-pairs at one or more intermediate locations (e.g., the C0 tablets) before copying the key-value pairs in batches to the C3 tablet 138, which, in the present example, may be the final destination for the data stored in the C0 tablets 136. Although in the present example C0 tablets are used for performing write amortization, it will be understood that the present disclosure is not limited to using any specific type of data structure. Although in the present example a C3 tablet are used to receive the data stored in the C0 tablets, it will be understood that the present disclosure is not limited to using any specific type of data structure. For example, in some implementations, the data stored in the C0 tablets may be merged into another data structure, such as a storage object (e.g., a storage volume or LUN), a file system data structure, etc. By way of example, in some implementations, the key-value pairs that are stored in the C0 and C3 tablets may include a counter index (as key) and increment/decrement numeric value as signed numeric value, while the value reported by KVE 110B may be the sum of per-transaction values accumulated for a specific key. However, it will be understood that KVE 110B is not limited to storying any specific type of key-value pairs.

Figure 2:
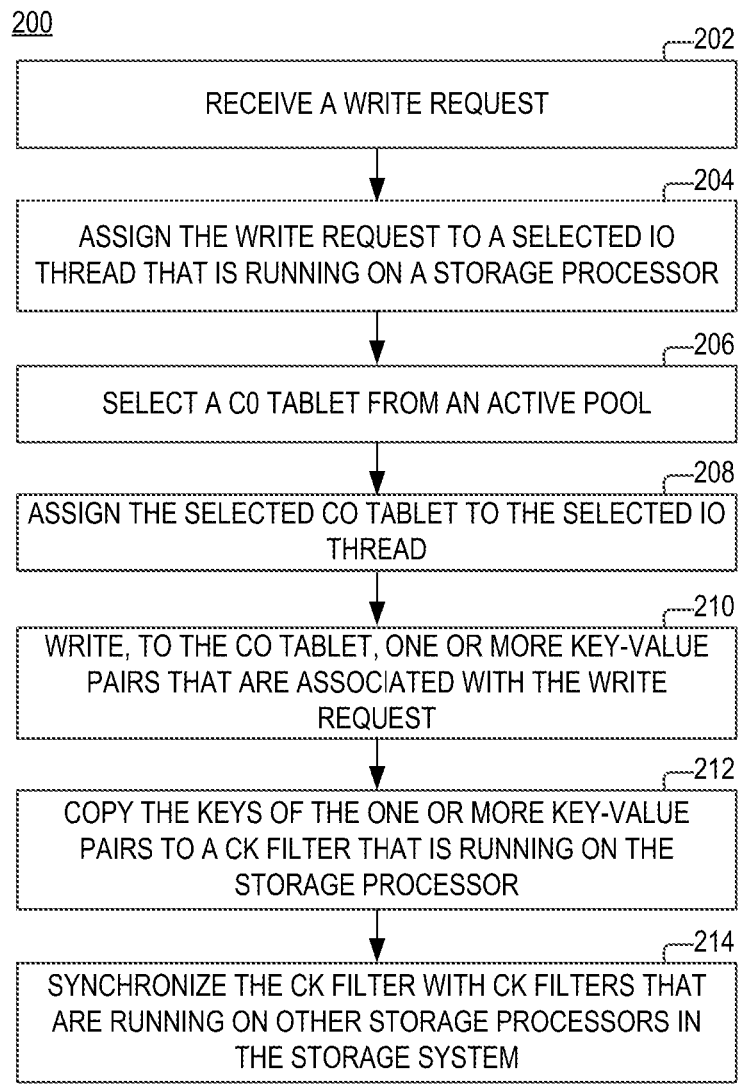
FIG. 2 is a flowchart of an example of a process, according to aspects of the disclosure.

FIG. 2 is a flowchart of an example of a process 200 for servicing write requests by the storage system 100. At step 202, the storage system 100 receives a write request from an external device. At step 204, the storage system 100 selects one of the IO threads 114A and assigns the write request to the selected IO thread. At step 206, the storage system 100 selects one of the C0 tablets in the active pool 132. At step 208, the storage system 100 assigns the selected C0 tablet to the selected IO thread. At step 210, the selected IO thread writes one or more key-value pairs that are associated with the write request to the selected C0 tablet. At step 212, the respective key in each of the key value-pairs (written at step 210) is extracted, and all (or at least some) of the extracted keys are written into the Ck filter 116A. As noted above, the keys that are extracted may be written to the portion (or data structure instance) of Ck filter 116A that is associated with the C0 tablet, where the key-value pairs are stored at step 210. At step 214, the mirroring service 118B synchronizes the Ck filter 116A with the Ck filter 116B by copying the one or more keys that are written to the Ck filter 116A (at step 210) to the Ck filter 116B. As noted above, the keys may be written to the portion (or data structure instance) of Ck filter 116B that is associated with the C0 tablet, where the key-value pairs are stored at step 210

FIG. 2 is provided to show the manner in which the C0 tablets 136 are used to service write requests. Specifically, FIG. 2 illustrates that when a write is received at the storage system 100, key-value pairs associated with the write request are written, by an IO thread, to one of the C0 tablets 136 in the active pool 132, and to the Ck filter that is running on the same storage processor as the IO thread. In addition, FIG. 2 illustrates that when a Ck filter is updated, one of the storage processors in the storage system 100, the Ck filter is also synchronized with other Ck filters that are executed by other storage processors in the storage system 100. In this regard, the Ck filters that are executed on different storage processors in the storage system 100 may also be thought of as being different instances of the same Ck filter. Although in the example of FIG. 1 the storage system 100 includes two storage processors, it will be understood that the storage system 100 may include any number of storage processors.

Figure 3B:
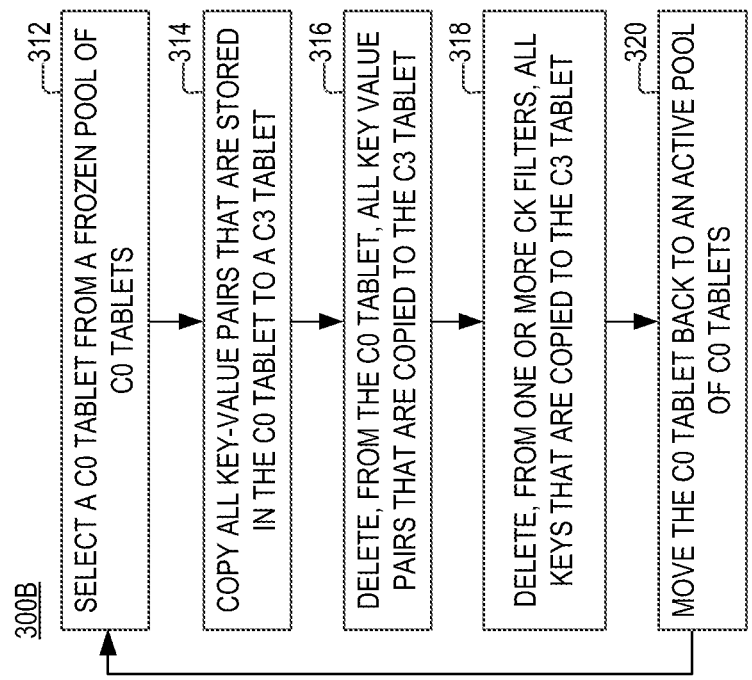
FIG. 3B is a flowchart of an example of a process, according to aspects of the disclosure.
Figure 3A:
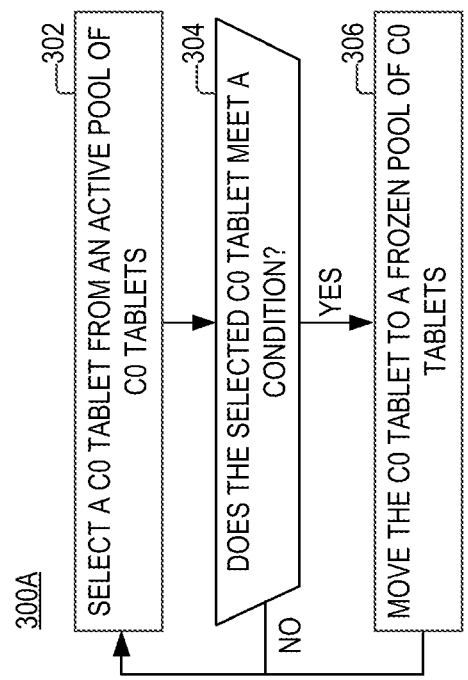
FIG. 3A is a flowchart of an example of a process, according to aspects of the disclosure.

FIG. 3A is a flowchart of an example of a process 300A, according to aspects of the disclosure. At step 302, the merging service 120 selects a C0 tablet 136 from the active pool 132. At step 304, the merging service 120 detects if a predetermined condition is satisfied by the selected C0 tablet. According to the present example, the predetermined condition is satisfied if the selected C0 tablet is full or if the selected C0 tablet has spent a predetermined amount of time in the active pool 132. If the predetermined condition is satisfied, the process 300A proceeds to step 306. If the predetermined condition is not satisfied, the process 300A returns to step 302 and another one of the C0 tablets 136 in the active pool 132 is selected. At step 306, the selected C0 tablet is removed from the active pool 132 and placed in the frozen pool 134.

FIG. 3B is a flowchart of an example of a process 300B, according to aspects of the disclosure. At step 312, merging service 120 selects a C0 tablet 136 from the frozen pool 134. At step 314, the merging service 120 copies all key-value pairs that are stored in the selected C0 tablet into the C3 tablet 138. At step 316, the merging service 120 deletes from the selected C0 tablet 136 all key-value pairs that have been copied into the C3 tablet 138. In other words, at step 316, the merging service 120 deletes the contents of the selected C0 tablet. Additionally or alternatively, in some implementations, the merging service 120 may reinitialize the selected C0 tablet. At step 318, all keys that represent key-value pairs which have been moved into the C3 tablet 138 (at step 314) are deleted from the Ck filters in the storage system 100. For example, at step 318, the entire (or at least some of) contents of the Ck filter 116A that is associated with the C0 tablet (selected at step 312) may be deleted. Similarly, at step 318, the entire (or at least some of) contents of the portion (or data structure instance) of the Ck filter 116A that is associated with the C0 tablet (selected at step 312) may be deleted. At step 320, the selected C0 tablet is removed from the frozen pool 134 and added to the active pool 132.

FIGS. 3A-B are provided to illustrate the manner in which C0 tablets are circulated between the active pool 132 and the frozen pool 134. When a C0 tablet is moved to frozen pool 134, the C0 tablet becomes write-protected, and no further key-value pairs can be stored in the C0 tablet as a result. Under the nomenclature of the present disclosure, the phrase "freezing a C0 tablet (or another data structure)" shall refer to at least one of: (i) the act of moving the C0 tablet to a frozen pool and/or (ii) the act of making the C0 tablet write-protected.

FIGS. 3A-B also illustrate that when key-value pairs are removed from a C0 tablet and placed in the C3 tablet 138, the keys of those pairs may also be deleted from at least one (or all) Ck filters in the storage system 100. The act of removing the contents of a C0 tablet and coping it into the C3 tablet 138 is referred to as "merging" of the C0 tablet with the C3 tablet.

Figure 4:
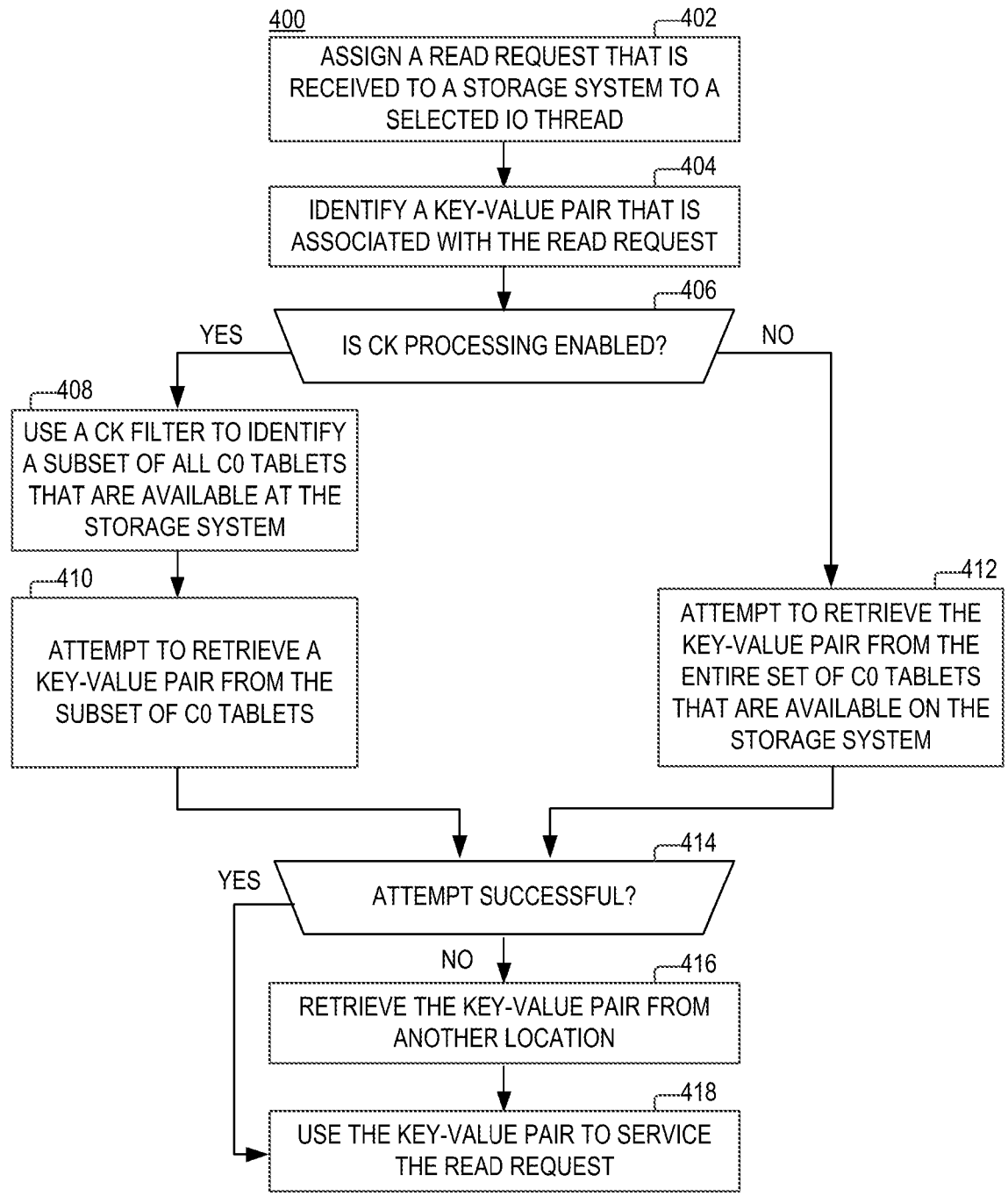
FIG. 4 is a flowchart of an example of a process, according to aspects of the disclosure.

FIG. 4 is a flowchart of an example of a process 400, according to aspects of the disclosure. At step 402, the storage system 100 assigns a read request (that is received at the storage system) to one of the IO threads 114A (hereinafter "selected IO thread). At step 404, the selected IO thread 114A identifies a key-value pair that is associated with the read request. At step 406, the selected IO thread detects if Ck processing is enabled on the storage processor 102A. If Ck processing is enabled, the process 400 proceeds to step 408. If Ck processing is disabled, the process 400 proceeds to step 412.

At step 408, the selected IO thread 114A uses the Ck filter 116A to identify a subset of all C0 tablets that are available in the backend 133, and which might contain the key-value pair (identified at step 404). At step 410, the selected IO thread 114A attempts to retrieve the key-value pair from the subset of C0 tablets that are identified with the help of the Ck filter 116A. Attempting to retrieve the key-value pair may include searching each of the C0 tablets in the subset (i.e., searching fewer than all of the C0 tablets that are instantiated on the backend 133) for the key-value pair. If the key-value pair is retrieved as a result of the search, the attempt is considered successful. If the search yields no results (i.e., if the key-value pair cannot be retrieved from the subset), the attempt is considered unsuccessful.

At step 412, the selected IO thread 114A attempts to retrieve the key-value pair from the entire set of C0 tablets 136 that are available on the backend 133. Attempting to retrieve the key-value pair may include searching each of the C0 tablets in the set (e.g., searching all of the C0 tablets that are instantiated on the backend 133) for the key-value pair. If the key-value pair is retrieved as a result of the search, the attempt is considered successful. If the search yields no results (i.e., if the key-value pair cannot be retrieved from the subset), the attempt is considered unsuccessful.

At step 414, the selected IO thread 114A determines whether the attempt to retrieve the key-value pair at step 410 or step 412 has been successful. If the attempt is successful, the process 400 proceeds to step 418. Otherwise, if the attempt is unsuccessful, the process 400 proceeds to step 416. At step 416, the selected IO thread 114A retrieves the key-value pair (identified at step 404) from another location. For example, the key-value pair may be retrieved from the C3 tablet 138 or from any of the storage devices 131. At step 418, the key-value pair is used to service the read request.

In one aspect, FIG. 4 is provided to illustrate the operation of the Ck filter 116A or any other Ck filter in the storage system 100. For each of the C0 tablets that are instantiated on the backend 133, the Ck filter 116A (or any other Ck filter in the storage system 100) may return one of the following values: (1) "the particular key-value pair is definitely not stored in the C0 tablet" and (2) "the particular key-value pair may or may not be stored in the C0 tablet." In other words, when searching for a particular key-value pair, an IO thread may use the Ck filter 116A to limit the number of C0 tablets that need to be searched. Although in the example of FIG. 1, each of the storage processors 102A and 102B executes (and uses) a Ck filter, it will be understood that alternative implementations are possible in which any of the storage processors executes (and uses) another type of approximate membership filter instead of a Ck filter.

In another aspect, FIG. 4 illustrates that Ck processing may be enabled or disabled in the storage system 100. When Ck processing is enabled, any of the IO threads in the storage system 100 may use a Ck filter (that is executed on the same storage processor as the IO thread) for the purposes of retrieving a key-value pair. On the other hand, when Ck processing is disabled, any of the IO threads in the storage system may not use a Ck filter for the purposes of retrieving a key-value pair. When Ck processing is disabled, the performance of the storage system 100 will be degraded, but the storage system 100 will remain operational nevertheless.

Figure 5:
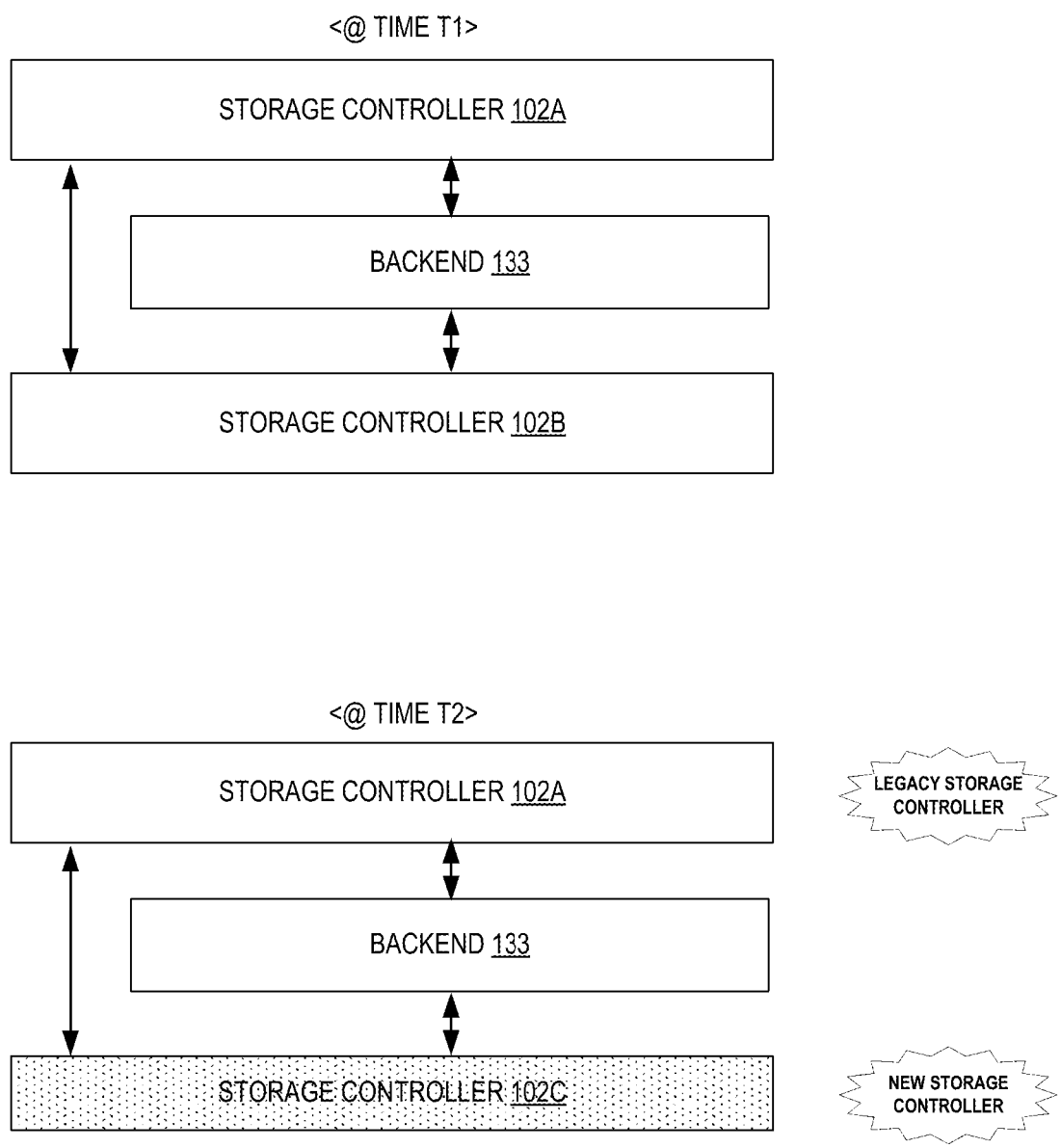
FIG. 5 is a diagram illustrating a scenario in which the storage system of FIG. 1 is updated to include new hardware, according to aspects of the disclosure.

FIG. 5 illustrates a scenario in which the storage system 100 is upgraded. At time T1, the storage system 100 may include the storage processor 102A, the storage processor 102B, and the backend 133. At time T2 the storage system 100 may be upgraded by replacing the storage processor 102B with a storage processor 102C. The storage processor 102C may be the same or similar to the computing device 700, which is discussed further below with respect to FIG. 7. The storage processor 102C may have a greater processing capacity than the storage processor 102B. For example, the storage processor 102C may have a greater number of processing cores than either one of the storage processors 102A and 102B. As another example, the storage processor 102C may have a greater number of processors than the storage processor 102A and 102B. As yet another example, the storage processor 102C may have a greater amount of memory than the storage processor 102A and the storage processor 102B. Under the nomenclature of the present disclosure, the storage processor 102A is referred to as a legacy storage processor, and the storage processor 102C is referred to as a new storage processor. Although in the example of FIG. 5, the storage system 100 includes only one legacy storage processor, it will be understood that in some implementations, the storage system 100 may include multiple legacy storage processors.

As noted above, the storage processor 102C may have greater capabilities than the storage processor 102B. The increased capabilities of the storage processor 102C allow it to execute a greater number of IO threads. However, when the number of IO threads in the storage system is increased, the number of C0 tablets may need to be increased as well (because each IO thread needs to be assigned a C0 tablet when servicing a write request). When the number of C0 tablets is increased on the backend 133, the Ck filters that are running on all legacy storage processors in the storage system 100 need to be rebuilt as well, so that they would be able to store data that is contained in any new C0 tablets that are instantiated on the backend 133.

Figure 6:
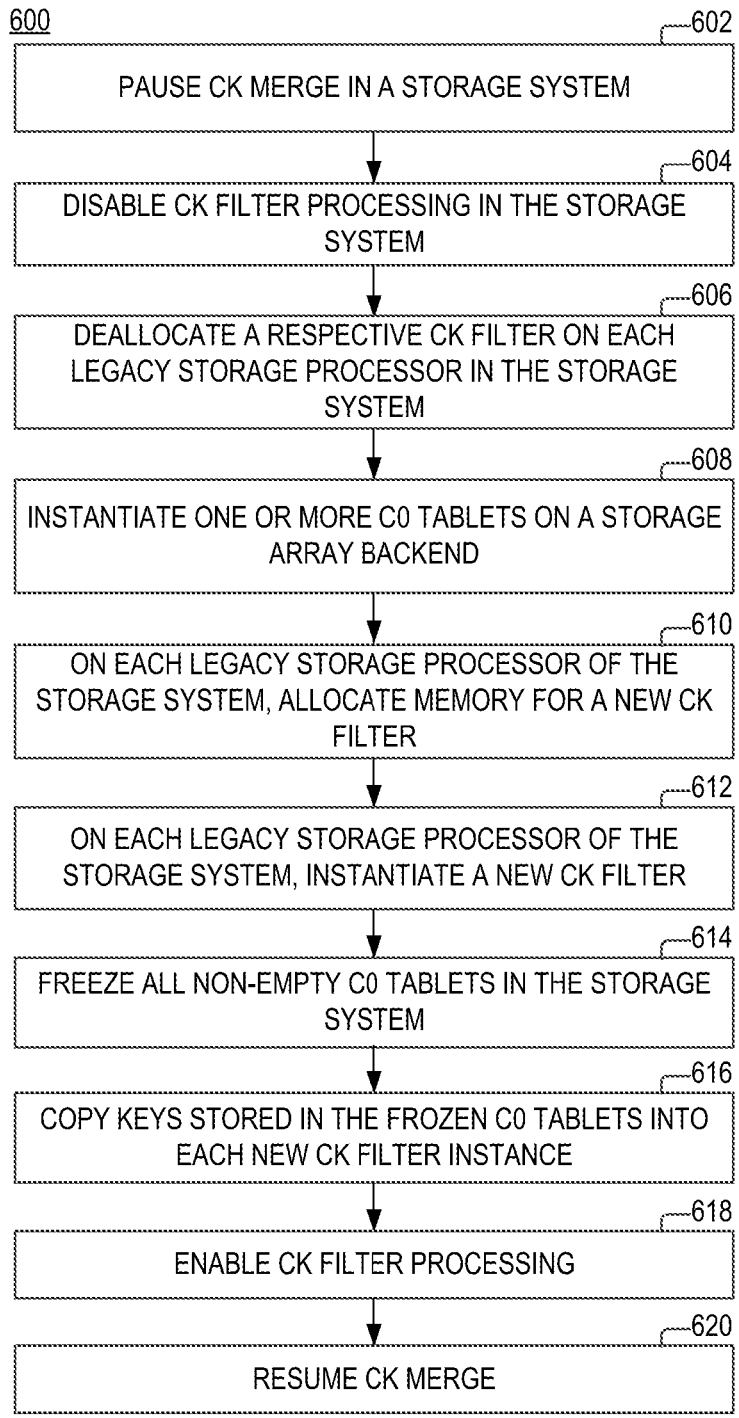
FIG. 6 is a flowchart of an example of a process, according to aspects of the disclosure.

FIG. 6 is a flowchart of an example of a process for rebuilding approximate membership filters in a storage system. In some implementations, the process 600 may be executed when a storage processor in the storage system 100 is replaced with another storage process, as in the example of FIG. 5. Additionally or alternatively, in some implementations, the process 600 may be executed when an additional storage processor is added to the storage system 100. As noted above, although in the example of FIG. 1, the storage system 100 includes only two storage processors, it will be understood that alternative implementations are possible in which the storage system 100 includes any number of storage processors. Similarly, although in the example of FIG. 5, the storage system 100 includes only one legacy storage processor, it will be understood that alternative implementations are possible in which the storage system 100 includes any number of legacy storage processors.

At step 602, Ck merge is paused in the storage system 100. Pausing Ck merge may include any suitable action that would prevent the contents of the C0 tablets 136 in the frozen pool 134 from being copied into the C3 tablet 138.

At step 604, Ck processing is disabled in the storage system. Pausing the Ck processing may include taking any action that would cause the storage processors in the storage system 100 to stop using their respective Ck filters when servicing read or write requests. In some implementations, the merging service 120 may transmit, to each (or at least some) of the storage processors in the storage system 100, an instruction, which, when executed, causes the storage processor to stop using its respective Ck filter when servicing read and/or write requests. In some implementations, the instruction may be transmitted over an Interconnect Service (ICS) link.

At step 606, the respective Ck filter on each legacy storage processor in the storage system 100 (e.g., the storage processor 102A) is deallocated. In some implementations, to deallocate the respective Ck filter on any legacy storage processor in the storage system 100, the merging service 120 may transmit to each (or at least one) legacy storage processor an instruction, which when executed, causes the storage processor to deallocate its respective Ck filter. Although in the example of FIG. 6, only Ck fitters that are executed on legacy storage processors in the storage system 100 are deallocated, alternative implementations are possible in which all Ck filters in the storage system 100 are deallocated, including Ck filters that are executed on new storage processors.

At step 608, one or more additional C0 tablets are instantiated on the backend 133. For example, the backend 133 may instantiate one or more new C0 tablets 136, thereby increasing the total count of C0 tablets 136 that are available on the backend 133. In some implementations, the one or more new C0 tablets may be added to the active pool 132, after they are instantiated.

At step 610, each of the legacy storage processors in the storage system 100 allocates memory for a new Ck filter. In some implementations, at step 610, the merging service 120 may transmit to each of the legacy storage processors in the storage system 100 an instruction, which, when executed, causes the storage processor to allocate memory for a new Ck filter. Although in the present example memory is allocated only on legacy storage processors in the storage system 100, alternative implementations are possible in which memory for a new Ck filter is allocated on each (or any) storage processor in the storage system 100, including new storage processors.

At step 612, each of the legacy storage processors in the storage system 100 instantiates a new Ck filter in its respective memory. In some implementations, at step 612, the merging service 120 may transmit to each of the legacy storage processors in the storage system 100 an instruction, which, when executed, causes the storage processor to instantiate a new Ck filter in its memory. Although in the example of FIG. 6 new Ck filters are allocated only in the memory of legacy storage processors in the storage system 100, alternative implementations are possible in which a new Ck filter is instantiated in the respective memory of any new storage processor in the storage system 100.

At step 614, all non-empty C0 tablets in the active pool 132 are frozen. For example, in some implementations, the merging service 120 may examine each C0 tablet that is placed in the active pool 132 to determine whether the C0 tablet contains one or more key-value pairs. If the C0 tablet contains one or more key-value pairs, the C0 tablet is removed from the active pool 132 and added to the frozen pool 134. On the other hand, if the C0 is empty, the C0 tablet is permitted to remain in the active pool. In some respects, after step 614 is executed, the storage system 100 may continue to service write requests and store key-value pairs in the C0 tablets 136 that remain in the active pool 132. In some respects, pausing Ck merge (at step 602) ensures that no C0 tablets 136 will be moved into the frozen pool 134 before the process 600 has finished executing. Furthermore, removing all non-empty tablets from the active pool 132 ensures that each Ck filter (created at step 612) will have a representation of each and every key that is written to the C0 tablets 136 after step 614 is completed. After all non-empty C0 tablets in the active pool 132 are frozen (at step 614), keys that are written into the C0 tablets, as part of servicing incoming write requests, will also be copied in the CK filter instances that are created at step 612. In other words, once the Ck filters are instantiated (at step 612), they may begin to be populated (as described above with respect to FIG. 2), when incoming write requests are serviced the storage system 100.

At step 616, the contents of C0 tablets 136 in the frozen pool 134 is used to rebuild the Ck filters in the storage system 100. Specifically, at step 616, each key that is stored in any of the C0 tablets 136 in the frozen pool 134 may be copied to all of the Ck filters instantiated at step 612. Additionally or alternatively, in some implementations, each key that is stored in any of the C0 tablets 136 may be copied to all Ck filters in the storage system 100, including Ck filters in legacy storage processors (which are instantiated at step 412) and Ck filters in new storage processors (which may or may not have been instantiated at step 412). As noted above, the keys that are stored in each frozen C0 tablet 136 may be copied to the respective portion (or data structure instance) of each of the Ck filters that is associated with the frozen C0 tablet 136

At step 618, Ck processing is enabled in the storage system 100. Enabling Ck processing in the storage system 100 may include taking any action that that would cause the storage processors in the storage system 100 to begin using their respective Ck filters when servicing read or write requests. In some implementations, at step 618, the merging service 120 may cause each of the storage processors in the storage system 100 to begin using its respective Ck filter when servicing read requests. Additionally or alternatively, in some implementations, the merging service 120 may transmit, to each of the storage processors in the storage system 100, an instruction, which, when executed, causes the storage processor to begin using its respective Ck filter when servicing read and/or write requests. In some implementations, the instruction may be transmitted over an ICS link.

At step 620, Ck merge is resumed in the storage system 100. Resuming Ck merge may include any suitable action that would cause the merging service 120 to resume copying the contents of the C0 tablets 136 in the frozen pool 134 into the C3 tablet 138.

According to the example of FIG. 6, the process 600 is performed by the merging service 120 (shown in FIG. 1). However, alternative implementations are possible in which the process 600 is performed, at least in part, by another node in the storage system 100, such as a system manager (not shown) or one of the storage processors 102A-B. Stated succinctly, the process 600 is not limited to being executed by any specific component of the storage system 100.

In some respects, executing the process 600, by the storage system 100, is advantageous because it helps increase the availability of the storage system 100. The process 600 is advantageous, because unlike conventional processes for rebuilding approximate membership filters, the process 600 does not require the storage system 100 to go offline in order for it to be executed.

Figure 7:
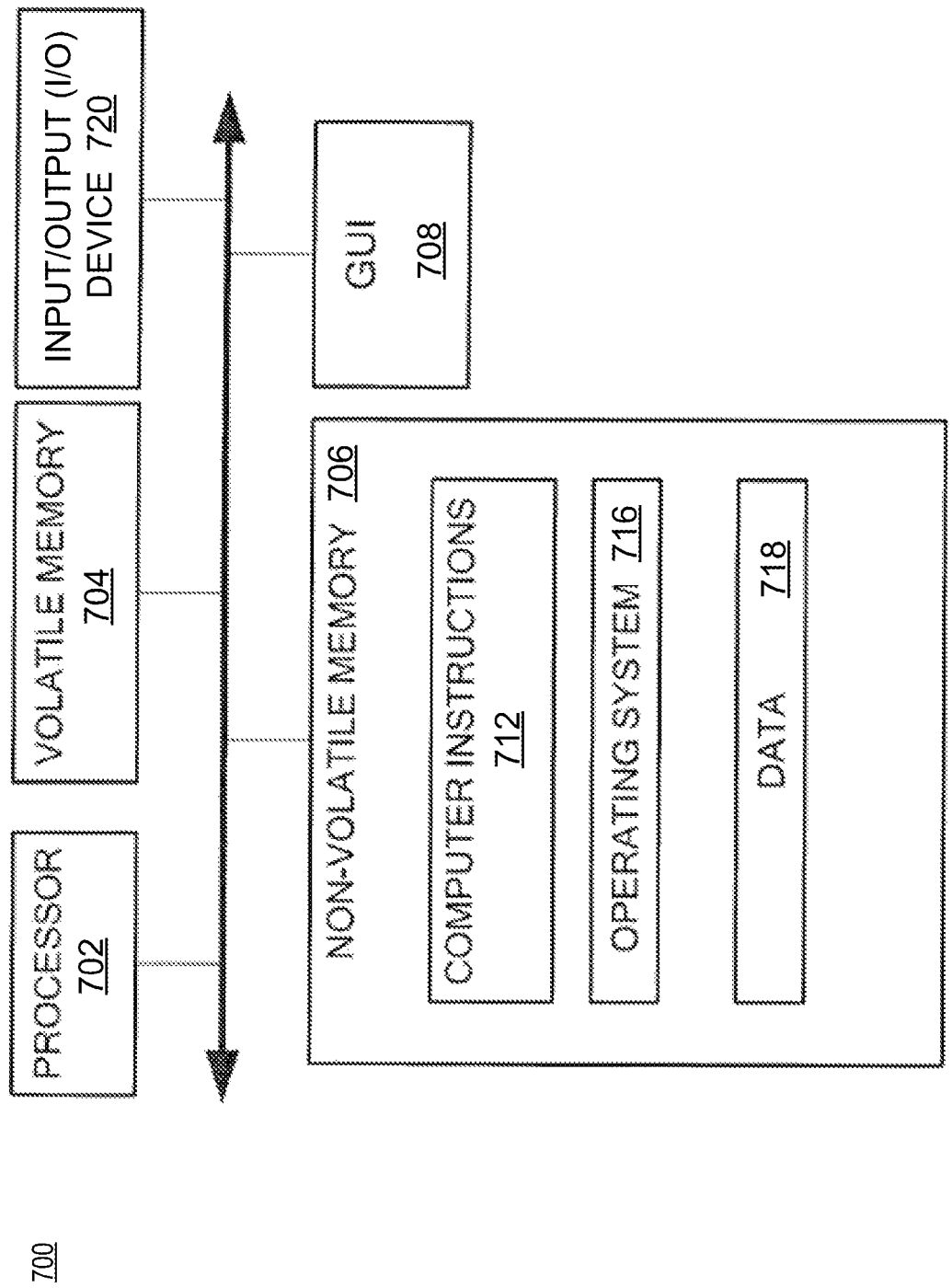
FIG. 7 is a diagram of an example of a computing device, according to aspects of the disclosure.

Referring to FIG. 7, a computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704. Program code may be applied to data entered using an input device of GUI 708 or received from I/O device 720.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

FIGS. 1-7 are provided as an example only. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. As used throughout the disclosure, the term "service" may, with respect to at least some implementations, refer to one or more processor-executable instructions that are arranged to perform one or more functions. The term 'service" is not intended to imply a specific implementation of one or more processor-executable instructions, such as implementation as a kernel module or implementation as an operating system service, etc. It will be understood that any of the entities discussed throughout the specification (e.g., a key-value engine, a merging pool, a mirroring service, etc.) may be implemented in software, in hardware, or as a combination of hardware and software.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, the method comprising:
   stopping to use one or more first approximate membership filters for servicing of read requests that are incoming to the storage system;
   increasing a size of a set of first data structures that are available in the storage system, each of the first data structures being used by the storage system for write request amortization;
   replacing the one or more first approximate membership filters with one or more second approximate membership filters, and building each of the one or more second approximate membership filters by: freezing all non-empty first data structures in the set, and copying respective contents of each of the frozen non-empty first data structures into any of the one or more second approximate membership filters; and
   starting to use the one or more second approximate membership filters for servicing of read requests that are incoming to the storage system,
   wherein the storage system continues to service incoming read requests without using approximate membership filters, after the use of the one or more first approximate filters is stopped, and before the use of the one or more second approximate membership filters has started.

2. The method of claim 1, wherein:
   a merging of the one or more first data structures into a second data structure is paused before the one or more first approximate membership filters are replaced with the one or more second approximate membership filters, and
   the merging of the one or more first data structures into the second data structure is resumed after the one or more first approximate membership filters are replaced with the one or more second approximate membership filters.

3. The method of claim 1, wherein each of the first data structures includes a C0 tablet, and each of the approximate membership filters includes a Cuckoo filter.

4. The method of claim 1, wherein increasing the size of the set of first data structures includes instantiating one or more new first data structures.

5. The method of claim 1, wherein the size of the set of first data structures is increased in response to a replacement of a first storage processor in the storage system with a second storage processor.

6. The method of claim 1, wherein the first data structures and a second data structure are stored in a backend of the storage system, the second data structure being arranged to receive contents of the first data structures.

7. The method of claim 1, wherein freezing any non-empty first data structure in the set includes removing the non-empty first data structure from a first pool that is used for servicing of write requests and adding the non-empty first data structure to a second pool of first data structures that is not used for servicing of write requests.

8. A storage system, comprising:
a memory; and
at least one processor that is operatively coupled to the memory, the at least one processor being configured to perform the operations of:
stopping to use one or more first approximate membership filters for servicing of read requests that are incoming to the storage system;
increasing a size of a set of first data structures that are available in the storage system, each of the first data structures being used by the storage system for write request amortization;
replacing the one or more first approximate membership filters with one or more second approximate membership filters, and building each of the one or more second approximate membership filters by: freezing all non-empty first data structures in the set, and copying respective contents of each of the frozen non-empty first data structures into any of the one or more second approximate membership filters; and
starting to use the one or more second approximate membership filters for servicing of read requests that are incoming to the storage system,
wherein the storage system continues to service incoming read requests without using approximate membership filters, after the use of the one or more first approximate membership filters is stopped, and before the use of the one or more second approximate membership filters has started.

9. The storage system of claim 8, wherein:
a merging of the one or more first data structures into a second data structure is paused before the one or more first approximate membership filters are replaced with the one or more second approximate membership filters, and
the merging of the one or more first data structures into the second data structure is resumed after the one or more first approximate membership filters are replaced with the one or more second approximate membership filters.

10. The storage system of claim 8, wherein each of the first data structures includes a C0 tablet, and each of the approximate membership filters includes a Cuckoo filter.

11. The storage system of claim 8, wherein increasing the size of the set of first data structures includes instantiating one or more new first data structures.

12. The storage system of claim 8, wherein the size of the set of first data structures is increased in response to a replacement of a first storage processor in the storage system with a second storage processor.

13. The storage system of claim 8, wherein the first data structures and a second data structure are stored in a backend of the storage system, the second data structure being arranged to receive contents of the first data structures.

14. The storage system of claim 8, wherein freezing any non-empty first data structure in the set includes removing the non-empty first data structure from a first pool that is used for servicing of write requests and adding the non-empty first data structure to a second pool of first data structures that is not used for servicing of write requests.

15. A non-transitory computer-readable medium storing one or more processor-executable instructions, which, when executed by one or more processors of a storage system, cause the one or more processors to perform the operations of:
stopping to use one or more first approximate membership filters for servicing of read requests that are incoming to the storage system;
increasing a size of a set of first data structures that are available in the storage system, each of the first data structures being used by the storage system for write request amortization;
replacing the one or more first approximate membership filters with one or more second membership filters, and building each of the one or more second approximate membership filters by: freezing all non-empty first data structures in the set, and copying respective contents of each of the frozen non-empty first data structures into any of the one or more second approximate membership filters; and
starting to use the one or more second approximate membership filters for servicing of read requests that are incoming to the storage system,
wherein the storage system continues to service incoming read requests without using approximate membership filters, after the use of the one or more first approximate filters is stopped, and before the use of the one or more second approximate membership filters has started.

16. The non-transitory computer-readable medium of claim 15, wherein:
a merging of the one or more first data structures into a second data structure is paused before the one or more first approximate membership filters are replaced with the one or more second approximate membership filters, and
the merging of the one or more first data structures into the second data structure is resumed after the one or more first approximate membership filters are replaced with the one or more second approximate membership filters.

17. The non-transitory computer-readable medium of claim 15, wherein each of the first data structures includes a C0 tablet, and each of the approximate membership filters includes a Cuckoo filter.

18. The non-transitory computer-readable medium of claim 15, wherein increasing the size of the set of first data structures includes instantiating one or more new first data structures.

19. The non-transitory computer-readable medium of claim 15, wherein the size of the set of first data structures is increased in response to a replacement of a first storage processor in the storage system with a second storage processor.

20. The non-transitory computer-readable medium of claim 15, wherein the first data structures and a second data structure are stored in a backend of the storage system, the second data structure being arranged to receive contents of the first data structures.

\* \* \* \* \*